No. 750,647. PATENTED JAN. 26, 1904.
F. B. HAYDEN.
VEHICLE TIRE PROTECTOR.
APPLICATION FILED OCT. 26, 1903.
NO MODEL.
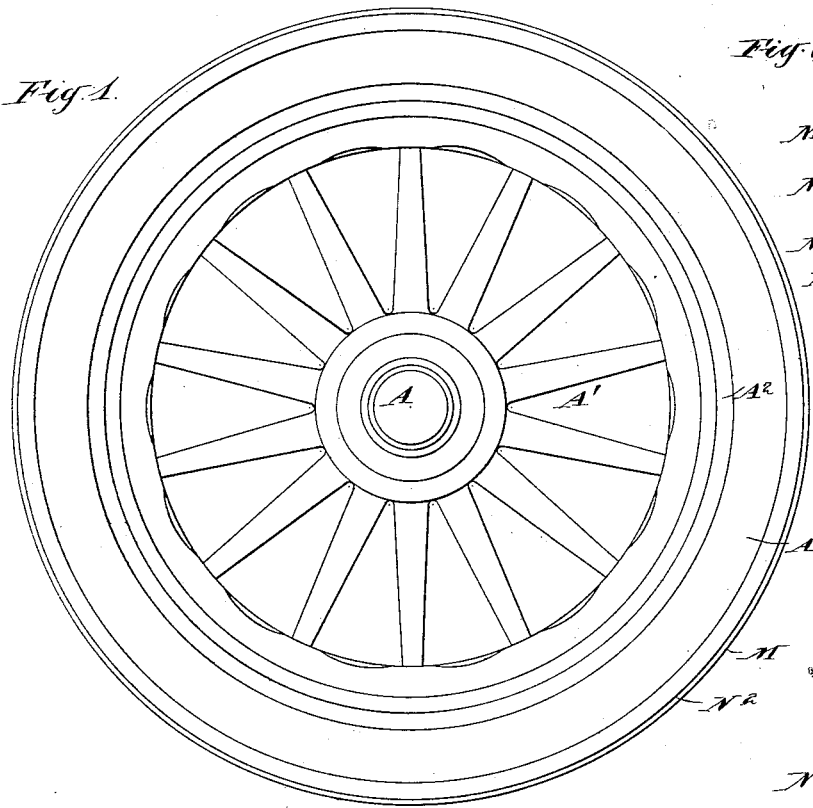
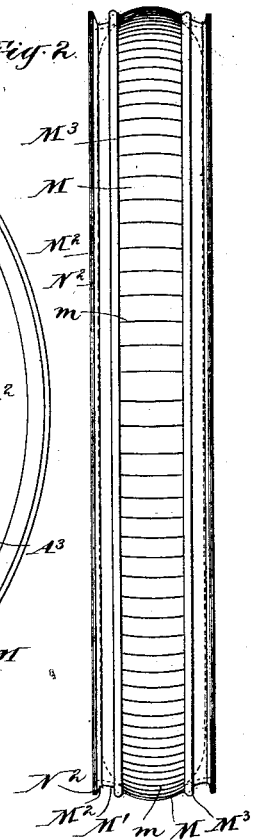
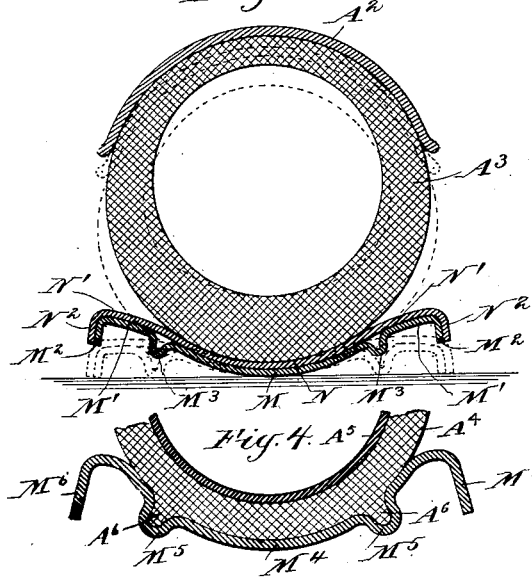

No. 750,647.

Patented January 26, 1904.

UNITED STATES PATENT OFFICE.

FREDERICK B. HAYDEN, OF BELLEVILLE, NEW JERSEY.

VEHICLE-TIRE PROTECTOR.

SPECIFICATION forming part of Letters Patent No. 750,647, dated January 26, 1904.

Application filed October 26, 1903. Serial No. 178,483. (No model.)

*To all whom it may concern:*

Be it known that I, FREDERICK B. HAYDEN, a citizen of the United States, residing in Belleville, in the county of Essex and State of New Jersey, have invented a certain new and useful Improvement in Vehicle-Tire Protectors, of which the following is a specification.

The invention relates to protective coverings for pneumatic tires; and the object of the invention is to provide a detachable armor in the form of an annular shoe which shall protect the tire from puncture, reduce the resistance due to suction or clinging of the tire to the road-surface, increase the grip on the latter, and reduce the tendency of the wheel to slip or slide laterally, as in turning short curves.

The invention consists in certain novel features and details of construction by which the above objects are attained, to be hereinafter described.

The accompanying drawings form a part of this specification and show the invention as applied to automobile-wheels.

Figure 1 is a side view of a wheel and tire equipped with my improved shoe, and Fig. 2 is a corresponding edge view. Fig. 3 is a transverse section through a single-tube tire and the shoe, on a larger scale. Fig. 4 shows a tire equipped with an inner tube and specially formed for service with the shoe.

Similar letters of reference indicate like parts in all the figures.

A is the hub, A' the spokes, $A^2$ the rim, and $A^3$ the pneumatic tire, of an automobile-wheel of the artillery type, but which may be of any ordinary or approved construction.

My improved covering or shoe is preferably of thin steel formed into an annulus inclosing the periphery of the tire and held in place thereon by the expansion of the tire due to the air-pressure therein, the shoe being applied while the tire is partially deflated.

Referring to Figs. 1, 2, and 3 of the drawings, the shoe is in two portions fitting one within the other and offering a double thickness of metal to resist puncture. The outer annulus or shoe proper is marked M and the inner annulus N. The latter is curved transversely along the peripheral line to match to and hug the tire when the latter is inflated and curves reversely outward at each side, as indicated at N' N', and terminates in annular outwardly-projecting flanges $N^2$ $N^2$. The shoe M is similarly formed to match closely to the inner annulus, but carries an outwardly-projecting annular ridge or corrugation $M^3$ on each of the reverse curved portions M' and terminates in flanges $M^2$, similar to the flanges $N^2$. The outer face of the shoe M is also corrugated transversely by scores or ridges $m$, serving to increase the grip on the road-surface. The width of the shoe is preferably greater than that of the tire. When the wheel is sustaining a light load on a smooth surface, the point of contact is a more or less area in the peripheral line, the ridges $M^3$ being clear of the surface and the flanges being still farther out of contact. Thus conditioned, the function of the shoe is to prevent puncturing of the tire and by the action of the flanges to force to one side or the other any loose stones or similar obstructions in the path of the wheel. When the tire flattens, as under a load, the shoe is also forced to flatten until its ridges $M^3$ and flanges $M^2$ contact with the surface. In this condition, which may be considered the normal, the ridges and flanges offer an additional area of surface contact and also serve to prevent lateral sliding. The width of the shoe serves in all cases to protect the sides of the tire from injury by rubbing-contact against railway-rails, curbs, and the like raised obstructions.

In the form shown in Fig. 4 the inner annulus is omitted, the shoe $M^4$ serving alone. In this figure the shoe grasps a greater portion of the peripheral face of the tire, and the flanges $M^6$ are correspondingly wider. The tire $A^4$ has annular ridges $A^6$ on its periphery matching to the interior grooves in the ridges $M^5$, thus increasing the grasp of the shoe upon the tire and lessening the liability of the shoe to creep laterally thereon. The tire is shown with an inner tube $A^5$.

The protecting-shoe increases the period of useful service of the tire without materially lessening the resiliency and greatly reduces the liability of the wheel to slide on frozen or other smooth slippery surfaces.

Other modifications may be made in the forms and proportions. There may be a greater or less number of annular corrugations or ridges, and the transverse scores or ridges may be deepened or omitted. More than the two thicknesses of thin metal may be employed, each annulus nesting within the next on wheels designed to sustain exceedingly-heavy loads. The width of the shoe may be increased or diminished, but should always exceed that of the tire.

I claim—

1. In a protective covering for vehicle-tires, an annulus of thin metal encircling the tire and curved transversely to match thereto, having a width greater than the tire, and an outwardly-extending circumferential flange on each projecting edge.

2. In a protective covering for vehicle-tires, an annulus of thin metal encircling the tire and curved transversely to match thereto, having a width greater than the tire, circumferential ridges on opposite sides of the peripheral line of the annulus, and an outwardly-extending circumferential flange on each projecting edge.

3. In a protective covering for vehicle-tires, an annulus of thin metal encircling the tire and curved transversely to match thereto, an outwardly-projecting circumferential flange on each edge of said annulus, a second annulus encircling the first-named, and matching thereto, having a circumferential ridge on each side of the peripheral line and a circumferential flange on each edge lying within the corresponding flange on the first-named annulus.

4. In combination with a pneumatic tire, an annulus of thin metal encircling said tire, and curved transversely to match thereto when said tire is inflated, a circumferential ridge on each side of the peripheral line of said annulus, and an outwardly-extendng circumferential flange on each edge of said annulus.

In testimony that I claim the invention above set forth I affix my signature in presence of two witnesses.

FREDERICK B. HAYDEN.

Witnesses:
ROBT. CONNOR,
CHARLES R. SEARLE.